(12) United States Patent
Hirooka et al.

(10) Patent No.: US 11,492,941 B1
(45) Date of Patent: Nov. 8, 2022

(54) CONTROLLER FOR INTERNAL COMBUSTION ENGINE

(71) Applicant: TOYOTA JIDOSHA KABUSHIKI KAISHA, Toyota (JP)

(72) Inventors: Shigemasa Hirooka, Susono (JP); Koichi Kitaura, Odawara (JP); Yoshio Yamashita, Susono (JP); Shingo Korenaga, Nagoya (JP); Katsuhiro Ito, Nagoya (JP); Hikaru Shiozawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/656,096

(22) Filed: Mar. 23, 2022

(30) Foreign Application Priority Data

Apr. 20, 2021 (JP) .............................. JP2021-071273

(51) Int. Cl.
*F01N 3/20* (2006.01)
*B01D 53/94* (2006.01)
*F01N 11/00* (2006.01)

(52) U.S. Cl.
CPC ....... *F01N 3/2013* (2013.01); *B01D 53/9495* (2013.01); *F01N 11/00* (2013.01); *F01N 2550/22* (2013.01)

(58) Field of Classification Search
CPC .... F01N 3/2013; F01N 11/00; F01N 2550/22; B01D 53/9495
See application file for complete search history.

(56) References Cited

U.S. PATENT DOCUMENTS

2018/0087427 A1* 3/2018 Korenaga ............. F01N 3/2013

FOREIGN PATENT DOCUMENTS

JP 2012-72665 A 4/2012

* cited by examiner

*Primary Examiner* — Brandon D Lee
(74) *Attorney, Agent, or Firm* — Oblon, McClelland, Maier & Neustadt, L.L.P.

(57) ABSTRACT

A controller is applied to an internal combustion engine in which an electrically heated catalyst that is heated when supplied with electric power is installed in an exhaust passage. The controller is configured to perform a preheating process of warming up a first exhaust catalyst by supplying electric power to the electrically heated catalyst through control over a power supply before a start of the internal combustion engine. The controller is configured to, when an insulation resistance of the electrically heated catalyst at a start of the preheating process is lower than a threshold, perform the preheating process while decreasing a voltage supplied to the electrically heated catalyst.

6 Claims, 5 Drawing Sheets

CONTROLLER FOR INTERNAL COMBUSTION ENGINE

CROSS-REFERENCE TO RELATED APPLICATION

This application claims priority to Japanese Patent Application No. 2021-071273 filed on Apr. 20, 2021, incorporated herein by reference in its entirety.

BACKGROUND

1. Technical Field

The present disclosure relates to a controller for an internal combustion engine.

2. Description of Related Art

An exhaust catalyst that reduces exhaust gas from an internal combustion engine exerts sufficient performance at an activation temperature. For this reason, in a state where the temperature of the exhaust catalyst is lower than the activation temperature, such as at a cold engine start, exhaust gas may not be sufficiently removed. There is known an electrically heated catalyst that is an exhaust catalyst provided in an exhaust passage of an internal combustion engine and imparted with the function of a heater that generates heat when supplied with electric power. With the electrically heated catalyst, it is possible to perform a preheating process of warming up the exhaust catalyst by supplying electric power to the electrically heated catalyst before the internal combustion engine is started.

For an electrically heated catalyst, it is desired to ensure sufficiently high insulation resistance to avoid a ground fault. Japanese Unexamined Patent Application Publication No. 2012-072665 (JP 2012-072665 A) describes a controller that controls the energization of an electrically heated catalyst. The controller of JP 2012-072665 A performs a recovery process to recover the insulation resistance of the electrically heated catalyst when the low insulation resistance is detected. Then, when the insulation resistance is not recovered even when the recovery process has been performed, the controller disables the energization of the electrically heated catalyst thereafter. In other words, the controller of JP 2012-072665 A does not immediately diagnose a fault even when the insulation resistance is low. The controller performs the recovery process, measures the insulation resistance again, and finally diagnoses the fault.

JP 2012-072665 A describes the recovery process in which the internal combustion engine is operated and the exhaust catalyst is heated by the exhaust gas from the internal combustion engine.

SUMMARY

By the way, when the internal combustion engine is operated without performing the preheating process as in the case of the recovery process described in JP 2012-072665 A, the internal combustion engine is operated in a state where the exhaust catalyst is not able to exert intrinsic performance. In other words, the internal combustion engine is operated in a state where exhaust gas is not sufficiently removed.

An aspect of the present disclosure relates to a controller applied to an internal combustion engine in which an electrically heated catalyst that is heated when supplied with electric power is installed in an exhaust passage. The controller is configured to perform a preheating process of warming up an exhaust catalyst by supplying electric power to the electrically heated catalyst through control over a power supply before a start of the internal combustion engine. The controller is configured to, when an insulation resistance of the electrically heated catalyst at a start of the preheating process is lower than a threshold, perform the preheating process while decreasing a voltage supplied to the electrically heated catalyst such that the voltage is lower than a voltage supplied when the insulation resistance of the electrically heated catalyst is higher than or equal to the threshold.

With the above configuration, when the insulation resistance is low, electric power is supplied to the electrically heated catalyst at a low voltage. Therefore, it is possible to avoid a ground fault even when the insulation resistance is low. As a result, the preheating process is able to be performed while avoiding a ground fault. The exhaust catalyst is warmed up without operating the internal combustion engine.

For this reason, with the above configuration, it is possible to reduce a situation in which the internal combustion engine is operated in a state where the exhaust catalyst is not able to exert sufficient performance. In one mode of the controller according to the above aspect, the controller may be configured to, when the insulation resistance of the electrically heated catalyst at the start of the preheating process is lower than a disable threshold lower than the threshold, disable energization of the electrically heated catalyst and stop the preheating process.

When the insulation resistance is too low, a ground fault can occur even at a low voltage, so it is desirable not to energize the electrically heated catalyst. With the above configuration, when the insulation resistance is lower than the disable threshold further lower than the threshold, the energization is disabled, and the preheating process is stopped. Therefore, it is possible to avoid a ground fault.

In one mode of the controller according to the above aspect, the controller may be configured to, when the insulation resistance of the electrically heated catalyst at the start of the preheating process is lower than the threshold, perform a recovery process of heating the electrically heated catalyst by using exhaust gas during operation of the internal combustion engine.

If carbon contained in exhaust gas adheres to the electrically heated catalyst or condensed water condensed from moisture in exhaust gas adheres to the electrically heated catalyst, a conduction path can be formed by the carbon or condensed water. When the recovery process is performed, a conduction path formed by carbon burns out or a conduction path disappears as a result of vaporization of condensed water, so the insulation resistance can be recovered.

With the above configuration, even when the insulation resistance at the start of the preheating process is low, it is possible to recover the insulation resistance through the recovery process during operation of the internal combustion engine thereafter. In one mode of the controller according to the above aspect, the controller may be configured to, when the insulation resistance of the electrically heated catalyst after the recovery process is performed is lower than a determination threshold, determine that there is an insulation fault in the electrically heated catalyst.

When the insulation resistance is not recovered even when the recovery process has been performed, it is presumable that there is a fault that cannot be resolved by the recovery process and that is not caused by formation of a conduction path by adherent carbon or condensed water. Therefore, with the above configuration, it is possible to diagnose a fault that cannot be resolved by the above recovery process based on the value of the insulation resistance after the recovery process is performed.

In one mode of the controller according to the above aspect, the controller may be configured to, when the insulation resistance of the electrically heated catalyst at the start of the preheating process is higher than or equal to the threshold, control the power supply while setting an upper limit value of the voltage in the preheating process to a first upper limit voltage. On the other hand, the controller may be configured to, when the insulation resistance of the electrically heated catalyst at the start of the preheating process is lower than the threshold, control the power supply while setting the upper limit value of the voltage in the preheating process to a second upper limit voltage lower than the first upper limit voltage.

The mode of performing the preheating process while decreasing the voltage when the insulation resistance of the electrically heated catalyst is lower than the threshold can be implemented by setting the upper limit voltage to the second upper limit voltage to decrease the upper limit value of the voltage, as described above.

In one mode of the controller according to the above aspect, the electrically heated catalyst may be supplied with electric power converted from electric power of a battery by the power supply that has a power supply circuit including an isolation transformer. A magnitude of the first upper limit voltage may be set to a magnitude such that the insulation resistance of the electrically heated catalyst becomes higher than or equal to 500 ohms per unit operating voltage.

When the insulation resistance of the electrically heated catalyst is higher than or equal to 500 ohms per unit operating voltage, it may be regarded that a sufficient insulation property is ensured. Therefore, as in the case of the above configuration, the magnitude of the first upper limit voltage can be set to a magnitude such that the insulation resistance of the electrically heated catalyst electrically insulated from the battery by the isolation transformer becomes higher than or equal to 500 ohms per unit operating voltage. With this configuration, it is possible to sufficiently avoid a ground fault.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of a controller for an internal combustion engine will be described with reference to FIG. 1 to FIG. 5.

Configuration of Vehicle

Initially, the configuration of a vehicle 10 on which a controller 100 according to the present embodiment will be described with reference to FIG. 1.

Figure 1:
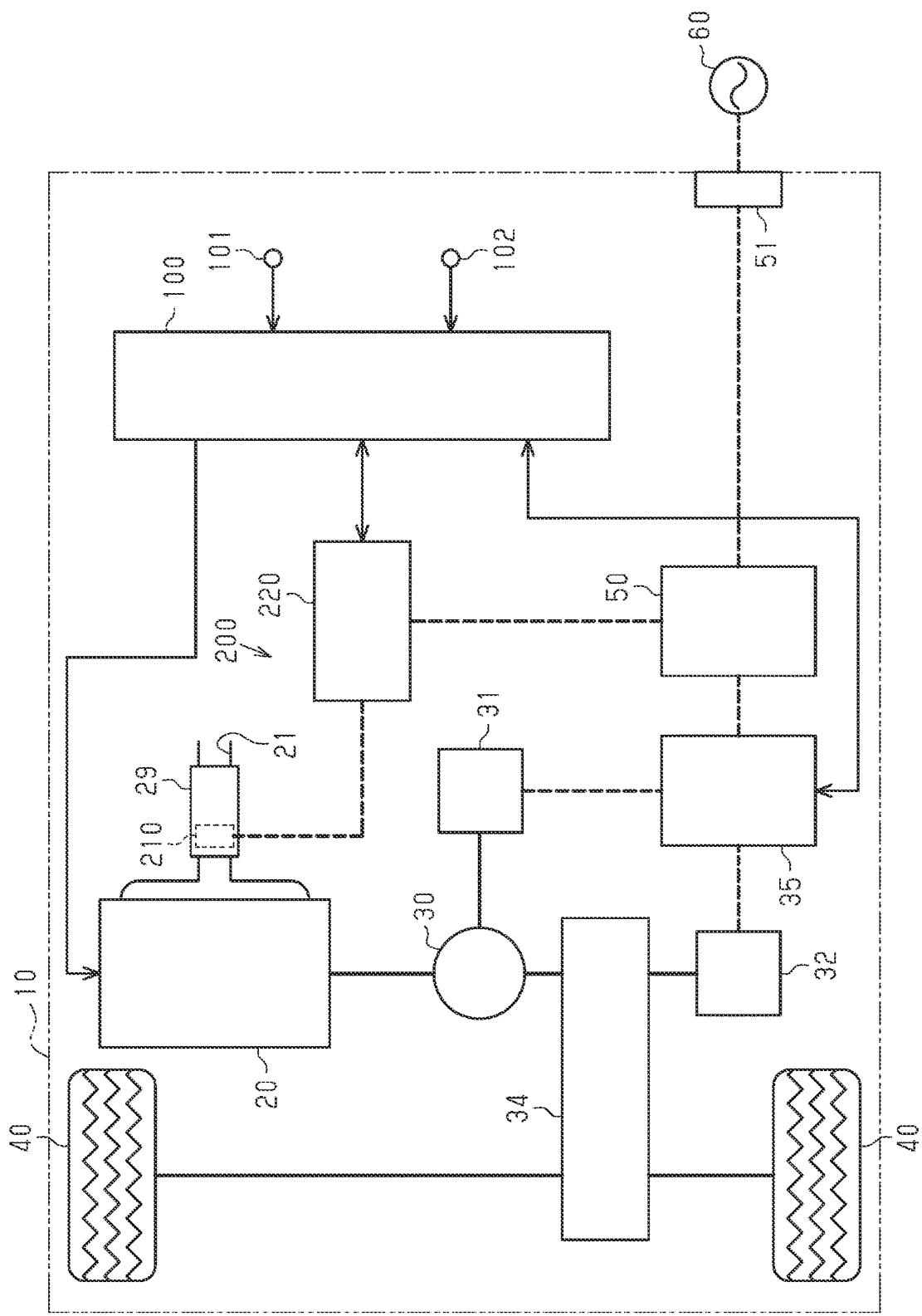
FIG. 1 is a schematic diagram showing the relationship between a controller for an internal combustion engine and a vehicle that includes the internal combustion engine to be controlled by the controller.

As shown in FIG. 1, the vehicle 10 includes an internal combustion engine 20 and a second motor generator 32 as power sources. In other words, the vehicle 10 is a hybrid electric vehicle. Among hybrid electric vehicles, the vehicle 10 is a plug-in hybrid electric vehicle capable of charging a battery 50 when connected to an external power supply 60. Therefore, a charger 51 for external charging is connected to the battery 50. The battery 50 is, for example, a 400 V high-voltage battery. The second motor generator 32 is, for example, a three-phase alternating-current motor generator.

A catalytic converter 29 is installed in an exhaust passage 21 of the internal combustion engine 20. An electrically heated catalyst 210 that generates heat when energized is mounted in the catalytic converter 29. The electrically heated catalyst 210 is connected to the battery 50 via a power supply 220. The detailed configuration of an electrically heated catalyst system 200 that includes the electrically heated catalyst 210 will be described later with reference to FIG. 2.

The second motor generator 32 is connected to the battery 50 via a power control unit 35. The second motor generator 32 is coupled to drive wheels 40 via a speed reduction mechanism 34.

The internal combustion engine 20 is coupled to the drive wheels 40 via a power split device 30 and the speed reduction mechanism 34. A first motor generator 31 is also coupled to the power split device 30. The first motor generator 31 is, for example, a three-phase alternating-current motor generator. The power split device 30 is a planetary gear train and is capable of distributing the driving force of the internal combustion engine 20 between the first motor generator 31 and the drive wheels 40.

The first motor generator 31 generates electric power upon receiving the driving force of the internal combustion engine 20 or the driving force from the drive wheels 40. The first motor generator 31 also serves as a starter that drives the rotary shaft of the internal combustion engine 20 at the time of starting the internal combustion engine 20. At this time, the first motor generator 31 functions as a motor that generates driving force in accordance with electric power supplied from the battery 50.

The first motor generator 31 and the second motor generator 32 are connected to the battery 50 via the power control unit 35. Alternating-current power generated by the first motor generator 31 is converted to direct-current power by the power control unit 35 and charged into the battery 50. In other words, the power control unit 35 functions as an inverter.

The direct-current power of the battery 50 is converted to alternating-current power by the power control unit 35 and supplied to the second motor generator 32. At the time of decelerating the vehicle 10, the second motor generator 32 is caused to generate electric power by using the driving force from the drive wheels 40. The generated electric power is charged into the battery 50. In other words, the vehicle 10 performs regenerative charging. At this time, the second motor generator 32 functions as a generator. During then, alternating-current power generated by the second motor generator 32 is converted to direct-current power by the power control unit 35 and charged into the battery 50.

When the first motor generator 31 is caused to function as a starter, the power control unit 35 converts the direct-current power of the battery 50 to alternating-current power and supplies the alternating-current power to the first motor generator 31.

Controller

The controller 100 controls the internal combustion engine 20, the first motor generator 31, and the second motor generator 32. In other words, the controller 100 is a controller that controls the power-train of the vehicle 10 that is a plug-in hybrid electric vehicle. For this reason, the controller 100 controls the internal combustion engine 20 that includes the electrically heated catalyst system 200. In short, the controller 100 is also a controller that controls the internal combustion engine 20.

Detection signals of sensors provided at various locations in the vehicle 10 are input to the controller 100. The detection signals input to the controller 100 include a vehicle speed, an accelerator pedal operation amount, and a state of charge SOC according to the residual capacity of the battery 50. A coolant temperature sensor 101 is connected to the controller 100. The coolant temperature sensor 101 detects a coolant temperature Tw that is the temperature of coolant of the internal combustion engine 20. A power switch 102 for a driver of the vehicle 10 to start up and stop the system of the vehicle 10 is also connected to the controller 100. Therefore, the controller 100 acquires the startup state of the system of the vehicle 10 based on an input signal from the power switch 102.

The vehicle 10 configured as described above is capable of running in EV mode in which the drive wheels 40 are driven by only the second motor generator 32 by driving the second motor generator 32 using electric power stored in the battery 50. The vehicle 10 is also capable of running in hybrid mode in which the drive wheels 40 are driven by the internal combustion engine 20 and the second motor generator 32.

Configuration of Electrically Heated Catalyst System

Figure 2:
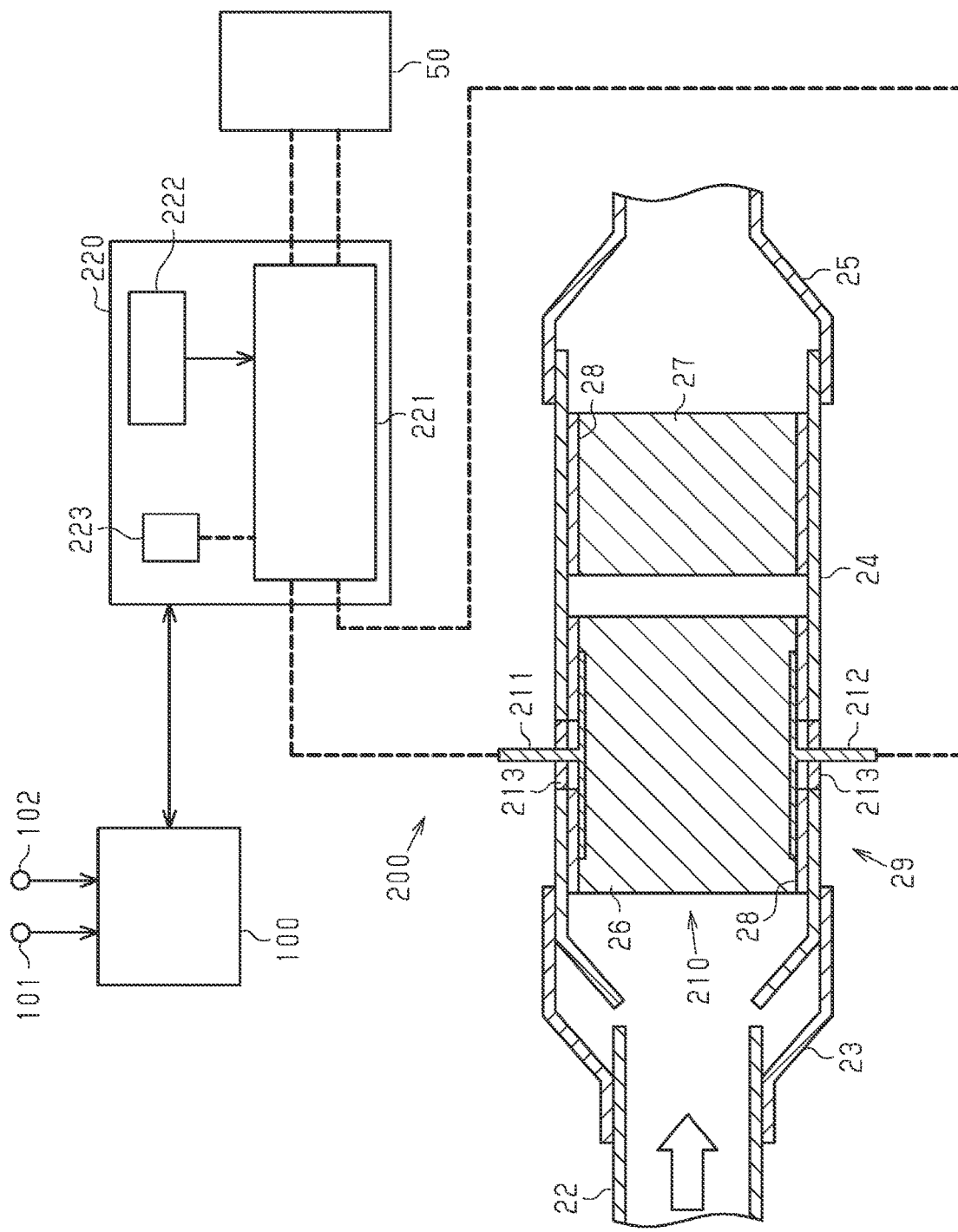
FIG. 2 is a schematic diagram showing the schematic configuration of an electrically heated catalyst system mounted on the vehicle according to an embodiment.

Next, the configuration of the electrically heated catalyst system 200 will be described with reference to FIG. 2. As shown in FIG. 2, not only a first exhaust catalyst 26 that makes up the electrically heated catalyst 210 but also a second exhaust catalyst 27 is mounted in the catalytic converter 29. The first exhaust catalyst 26 and the second exhaust catalyst 27 each are configured such that a three-way catalyst is carried on a honeycomb catalyst carrier in which a plurality of passages extending in a direction in which exhaust gas flows is partitioned.

The first exhaust catalyst 26 and the second exhaust catalyst 27 are accommodated in a case 24. The case 24 is a hollow cylinder made of a metal, for example, stainless steel. The case 24 makes up part of the exhaust passage 21. In the case 24, a mat 28 is interposed between the case 24 and each of the first exhaust catalyst 26 and the second exhaust catalyst 27. The mat 28 is an insulator and is made from, for example, inorganic fiber mainly containing alumina.

The mat 28 is interposed between the case 24 and each of the first exhaust catalyst 26 and the second exhaust catalyst 27 in a compressed state. Therefore, the first exhaust catalyst 26 and the second exhaust catalyst 27 are held in the case 24 by the restoring force of the compressed mats 28.

An upstream connecting pipe 23 that reduces in diameter toward the upstream side covers an upstream part of the case 24 from outside and is fixed. A downstream connecting pipe 25 that reduces in diameter toward the downstream side covers a downstream part of the case 24 from outside and is fixed.

As shown in FIG. 2, the upstream connecting pipe 23 connects the case 24 with an upstream exhaust pipe 22 less in diameter than the case 24. Similarly, the downstream connecting pipe 25 connects the case 24 with a downstream exhaust pipe less in diameter than the case 24. In this way, the case 24 that accommodates the first exhaust catalyst 26 and the second exhaust catalyst 27, the upstream connecting pipe 23, and the downstream connecting pipe 25 make up the catalytic converter 29 that makes up part of the exhaust passage 21.

An upstream-side end of the case 24 reduces in diameter toward the upstream exhaust pipe 22, and the diameter of a part closest to the upstream exhaust pipe 22 is substantially equal to the diameter of the upstream exhaust pipe 22.

The first exhaust catalyst 26 is located upstream of the second exhaust catalyst 27. The catalyst carrier of the first exhaust catalyst 26 is made of a material that serves as an electrical resistance to generate heat when energized. For example, silicon carbide may be used as such a material.

A first electrode 211 and a second electrode 212 are attached to the first exhaust catalyst 26. The first electrode 211 is a positive electrode, and the second electrode 212 is a negative electrode. A current flows through the first exhaust catalyst 26 when a voltage is applied between the first electrode 211 and the second electrode 212. When a current flows through the first exhaust catalyst 26, the catalyst carrier generates heat by the electrical resistance of the catalyst carrier.

To uniformly pass a current through the entire catalyst carrier, the first electrode 211 and the second electrode 212 extend in a circumferential direction and in an axial direction along the outer periphery of the catalyst carrier. The first electrode 211 and the second electrode 212 each extend through the case 24.

An electrical porcelain 213 made of an insulating material, such as alumina, is fitted in between the case 24 and each of the first electrode 211 and the second electrode 212. An insulating material is applied to the inner periphery of the case 24 to provide an insulating coating. For example, a glass coating may be used as an insulating coating. Thus, the first exhaust catalyst 26 is electrically insulated from the case 24.

As described above, the first electrode 211 and the second electrode 212 are attached to the first exhaust catalyst 26. Thus, the first exhaust catalyst 26 is the electrically heated catalyst 210 that generates heat when supplied with electric power. Hereinafter, the electrically heated catalyst 210 is referred to as EHC 210. The first exhaust catalyst 26 is heated by heat generated by the catalyst carrier as a result of energization, and activation of the first exhaust catalyst 26 is facilitated.

When the internal combustion engine 20 operates and exhaust gas flows, heat is also transferred to the second exhaust catalyst 27 by exhaust gas warmed up as a result of passing through the EHC 210. Thus, warming up of the second exhaust catalyst 27 is also facilitated.

The first electrode 211 and the second electrode 212 are connected to the battery 50 via a power supply circuit 221 of the power supply 220. The power supply 220 includes the power supply circuit 221 and a power supply microcontroller 222. The power supply circuit 221 includes an insulation transistor and a power switching element. The power supply microcontroller controls the power supply circuit 221. A ground-fault detection circuit 223 is provided in the power supply 220. The ground-fault detection circuit 223 is connected to the power supply circuit 221 and detects a ground fault by detecting the insulation resistance of the EHC 210. For example, the ground-fault detection circuit 223 includes a voltmeter and calculates the insulation resistance value Rt of the EHC 210 based on the voltage measured by the voltmeter.

The power supply 220 is connected to the controller 100 so as to be able to communicate with the controller 100. The insulation resistance value Rt calculated by the ground-fault detection circuit 223 is output to the controller 100. The controller 100 outputs an instruction to the power supply 220 and controls the energization of the EHC 210 via the power supply 220.

Preheating Process

The vehicle 10 that is a plug-in hybrid electric vehicle runs in EV mode in which only the second motor generator 32 is used as a drive power source when there is a sufficient allowance in the state of charge SOC of the battery 50. At this time, the controller 100 maintains the internal combustion engine 20 in a stopped state. The controller 100 controls the power control unit 35 such that the second motor generator 32 generates a torque by which the driving force corresponding to a required driving force is obtained.

When the state of charge SOC of the battery 50 becomes lower than a certain value while running in EV mode, the controller 100 switches the drive mode of the vehicle 10 from EV mode to hybrid mode. The hybrid mode is a drive mode in which both the internal combustion engine 20 and the second motor generator 32 are used as drive power sources.

To make it possible to exert sufficient exhaust gas control performance just after switching into hybrid mode, it is desirable to warm up the first exhaust catalyst 26 by energizing the EHC 210 before the internal combustion engine 20 is started as a result of shifting into hybrid mode.

For this reason, the controller 100 performs a preheating process of warming up the first exhaust catalyst 26 by energizing the EHC 210 before the internal combustion engine 20 is started.

Routine for Preheating Process

Next, a routine for the preheating process will be described with reference to FIG. 3. The routine is repeatedly executed by the controller 100 when the power switch 102 is on and the system of the vehicle 10 is in operation.

Figure 3:
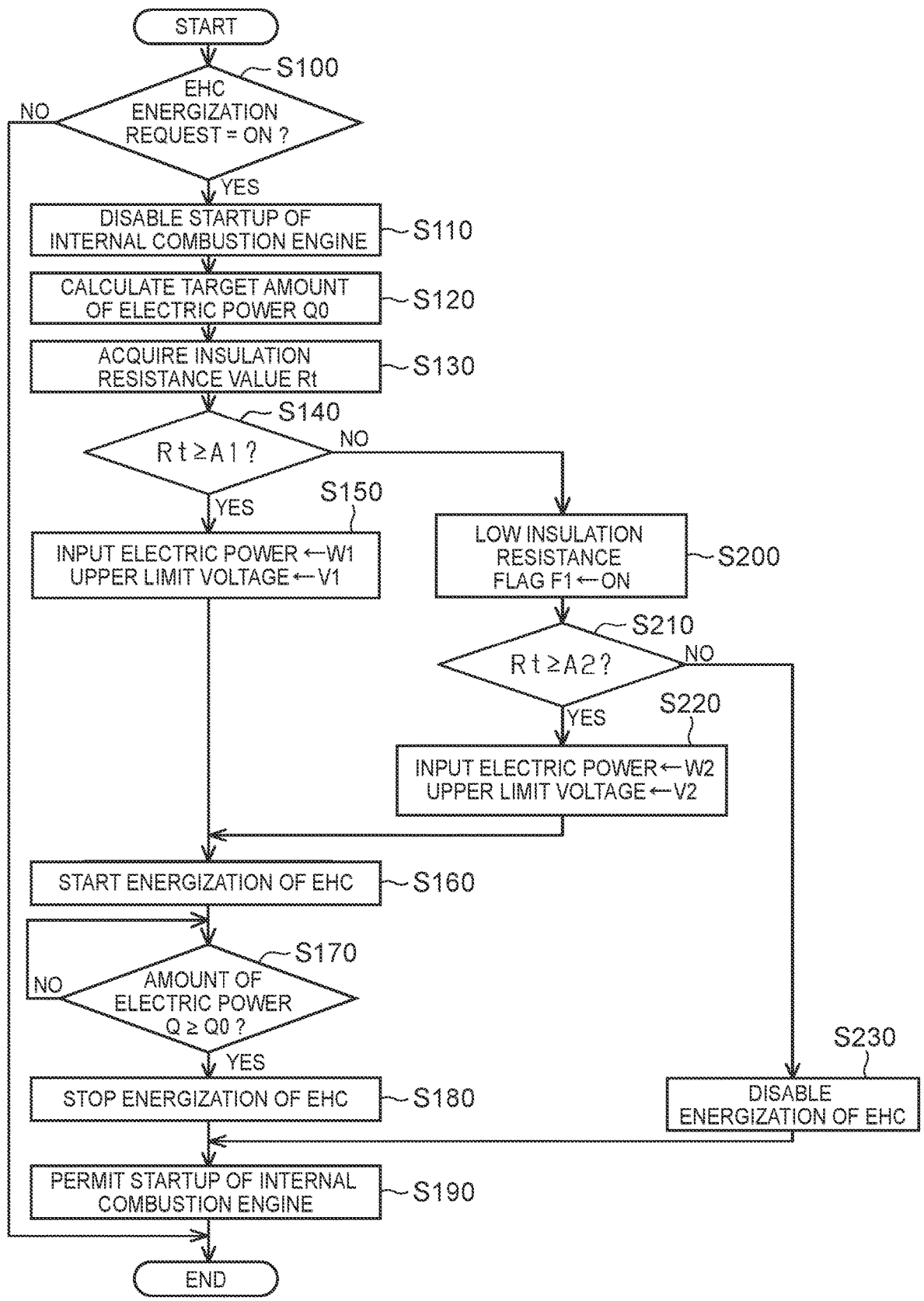
FIG. 3 is a flowchart showing the flow of processes in a routine of a preheating process performed by the controller according to the embodiment.

As shown in FIG. 3, when the routine is started, the controller 100 initially determines in the process of step S100 whether an EHC energization request is on. The EHC energization request is a request to energize the EHC 210. Specifically, the controller 100 determines that the EHC energization request is on when both the following two conditions are satisfied.

The state of charge SOC is lower than a threshold for switching into hybrid mode. The temperature of the first exhaust catalyst 26 is lower than or equal to a prescribed temperature lower than an activation temperature. The controller 100 estimates the temperature of the first exhaust catalyst 26 based on the coolant temperature Tw detected by the coolant temperature sensor 101. For example, the controller 100 performs determination in step S100 on the assumption that the coolant temperature Tw detected by the coolant temperature sensor 101 is the temperature of the first exhaust catalyst 26.

When the controller 100 determines in the process of step S100 that the EHC energization request is not on (NO in step S100), the controller 100 ends the routine. In other words, in this case, the controller 100 does not perform the preheating process.

On the other hand, when the controller 100 determines in the process of step S100 that the EHC energization request is on (YES in step S100), the controller 100 proceeds with the process to step S110.

In the process of step S110, the controller 100 disables the startup of the internal combustion engine 20 as part of the preheating process. The controller 100 proceeds with the process to step S120. In the process of step S120, the controller 100 calculates a target amount of electric power Q0. Specifically, the controller 100 calculates a target amount of electric power Q0 in accordance with the temperature of the first exhaust catalyst 26, estimated in the process of step S100. In the preheating process, the first exhaust catalyst 26 is heated and warmed up to the activation temperature or higher by continuing the energization of the EHC 210 until the amount of electric power Q that is an accumulated value of input electric power reaches the target amount of electric power Q0. In other words, the target amount of electric power Q0 is an amount of electric power required to heat the first exhaust catalyst 26 until completion of warming up from the temperature before the energization is started. For this reason, in the process of step S120, the controller 100 calculates a greater target amount of electric power Q0 as the temperature of the first exhaust catalyst 26 decreases.

Subsequently, the controller 100 acquires the insulation resistance value Rt of the EHC 210 by using the ground-fault detection circuit 223 in the process of step S130. The controller 100 determines in the process of step S140 whether the insulation resistance value Rt is higher than or equal to a threshold A1. The threshold A1 is a threshold for determining a state where the insulation resistance of the EHC 210 is sufficiently high in avoiding a ground fault and the EHC 210 is able to be energized at a normal voltage.

When the controller 100 determines in the process of step S140 that the insulation resistance value Rt is higher than or equal to the threshold A1 (YES in step S140), the controller 100 proceeds with the process to step S150. In the process of step S150, the controller 100 sets the input electric power input to the EHC 210 to a first electric power W1 and sets the upper limit voltage to a first upper limit voltage V1. The magnitude of the first upper limit voltage V1 is set to a magnitude such that the insulation resistance value Rt of the EHC 210 becomes higher than or equal to 500 ohms per unit operating voltage.

After that, the controller 100 proceeds with the process to step S160. The controller 100 starts the energization of the EHC 210 in the process of step S160. In the preheating process, the controller 100 converts the voltage of the battery 50 by controlling the power supply circuit 221 such that the input electric power becomes a set value and supplies electric power to the EHC 210. When the temperature of the first exhaust catalyst 26 increases by the preheating process, the electrical resistance of the EHC 210 gradually decreases accordingly. For this reason, the controller 100 maintains the input electric power to a set value by decreasing the voltage in accordance with a decrease in the electrical resistance of the EHC 210. The controller 100 controls the voltage in a range lower than or equal to the upper limit voltage such that the voltage does not exceed the value of the set upper limit voltage. In other words, the upper limit voltage is an upper limit value of the voltage at the time of controlling the voltage in the preheating process. When the energization is started, the controller 100 starts accumulating the input electric power. The controller 100 continues calculating the amount of electric power Q input to the EHC 210 by accumulating the input electric power while the EHC 210 is energized. Performing the preheating process in a state where the input electric power input to the EHC 210 is set to the first electric power W1 and the upper limit voltage is set to the first upper limit voltage V1 corresponds to a state where the EHC 210 is energized at a normal voltage.

In the process of the next step S170, the controller 100 determines whether the amount of electric power Q is greater than or equal to the target amount of electric power Q0. When the controller 100 determines in the process of step S170 that the amount of electric power Q is less than the target amount of electric power Q0 (NO in step S170), the controller 100 repeats the process of step S170. On the other hand, when the controller 100 determines in the process of step S170 that the amount of electric power Q is greater than or equal to the target amount of electric power Q0 (YES in step S170), the controller 100 proceeds with the process to step S180 and stops the energization of the EHC 210. In other words, the controller 100 continues energization until the amount of electric power Q reaches the target amount of electric power Q0. When the amount of electric power Q reaches the target amount of electric power Q0, the controller 100 stops the preheating process by stopping the energization.

When the controller 100 stops the preheating process through the process of step S180, the controller 100 proceeds with the process to step S190. The controller 100 cancels disabling of startup of the internal combustion engine 20 and permits startup of the internal combustion engine 20 in the process of step S190. The controller 100 ends the routine.

On the other hand, when the controller 100 determines in the process of step S140 that the insulation resistance value Rt is lower than the threshold A1 (NO in step S140), the controller 100 proceeds with the process to step S200. The controller 100 sets a low insulation resistance flag F1 to on in the process of step S200. The low insulation resistance flag F1 is a flag that indicates that the insulation resistance value Rt acquired in the process of step S130, that is, the insulation resistance value Rt at the start of the preheating process, is lower than the threshold A1.

After that, the controller 100 proceeds with the process to step S210. In the process of step S210, the controller 100 determines whether the insulation resistance value Rt is higher than or equal to a disable threshold A2 lower than the threshold A1. The disable threshold A2 is a threshold for determining a state where the energization of the EHC 210 should be disabled based on the fact that the insulation resistance value Rt is lower than the disable threshold A2.

When the controller 100 determines in the process of step S210 that the insulation resistance value Rt is lower than the disable threshold A2 (NO in step S210), the controller 100 proceeds with the process to step S230. In the process of step S230, the controller 100 stops the energization of the EHC 210 by disabling the energization of the EHC 210 and stops the preheating process. Disabling the energization of the EHC 210 continues until the low insulation resistance flag F1 is set to off.

When the controller 100 stops the preheating process through the process of step S230, the controller 100 proceeds with the process to step S190. The controller 100 cancels disabling of startup of the internal combustion engine 20 and permits startup of the internal combustion engine 20 in the process of step S190. The controller 100 ends the routine.

When the controller 100 determines in the process of step S210 that the insulation resistance value Rt is higher than or equal to the disable threshold A2 (YES in step S210), the controller 100 proceeds with the process to step S220. In the process of step S220, the controller 100 sets the input electric power input to the EHC 210 to a second electric power W2 and sets the upper limit voltage to a second upper limit voltage V2. The second electric power W2 is lower than the first electric power W1. Here, for example, the second electric power W2 is half of the first electric power W1. The second upper limit voltage V2 is lower than the first upper limit voltage V1. Here, for example, the second upper limit voltage V2 is half of the first upper limit voltage V1.

After that, the controller 100 proceeds with the process to step S160. The controller 100 starts the energization of the EHC 210 in the process of step S160. The controller 100 continues the energization until the amount of electric power Q reaches the target amount of electric power Q0 through the processes of step S170 and step S180 and, when the amount of electric power Q reaches the target amount of electric power Q0, stops the preheating process by stopping the energization.

When the controller 100 stops the preheating process through the process of step S180, the controller 100 proceeds with the process to step S190. The controller 100 cancels disabling of startup of the internal combustion engine 20 and permits startup of the internal combustion engine 20 in the process of step S190. The controller 100 ends the routine.

Recovery Process

Next, a routine for the recovery process performed by the controller 100 will be described with reference to FIG. 4. The recovery process is a process for recovering the decreased insulation resistance of the EHC 210.

If carbon contained in exhaust gas adheres in the case 24 treated with the insulating coating or condensed water condensed from moisture in exhaust gas adheres in the case 24 treated with the insulating coating, a conduction path can be formed by carbon or condensed water. In other words, carbon or condensed water adhering to the surface of the insulating coating can be formed continuously and, as a result, a conduction path that connects the first exhaust catalyst 26 in which a current is flowing with a part not treated with the insulating coating can be formed. As shown in FIG. 2, in the catalytic converter 29, the case 24 extends to a location upstream of a part where the first exhaust catalyst 26 is accommodated. Since the case 24 extends to a location apart from the first exhaust catalyst 26 in which a current flows, the surface area of the case 24 up to the part not treated with the insulating coating increases. Thus, the effect of suppressing formation of a conduction path is expected.

The recovery process is a process of heating the case 24 by using exhaust gas from the internal combustion engine 20 to burn out a conduction path formed by carbon or eliminate a conduction path by vaporizing condensed water. When the recovery process is performed, the insulation resistance can be recovered.

Figure 4:
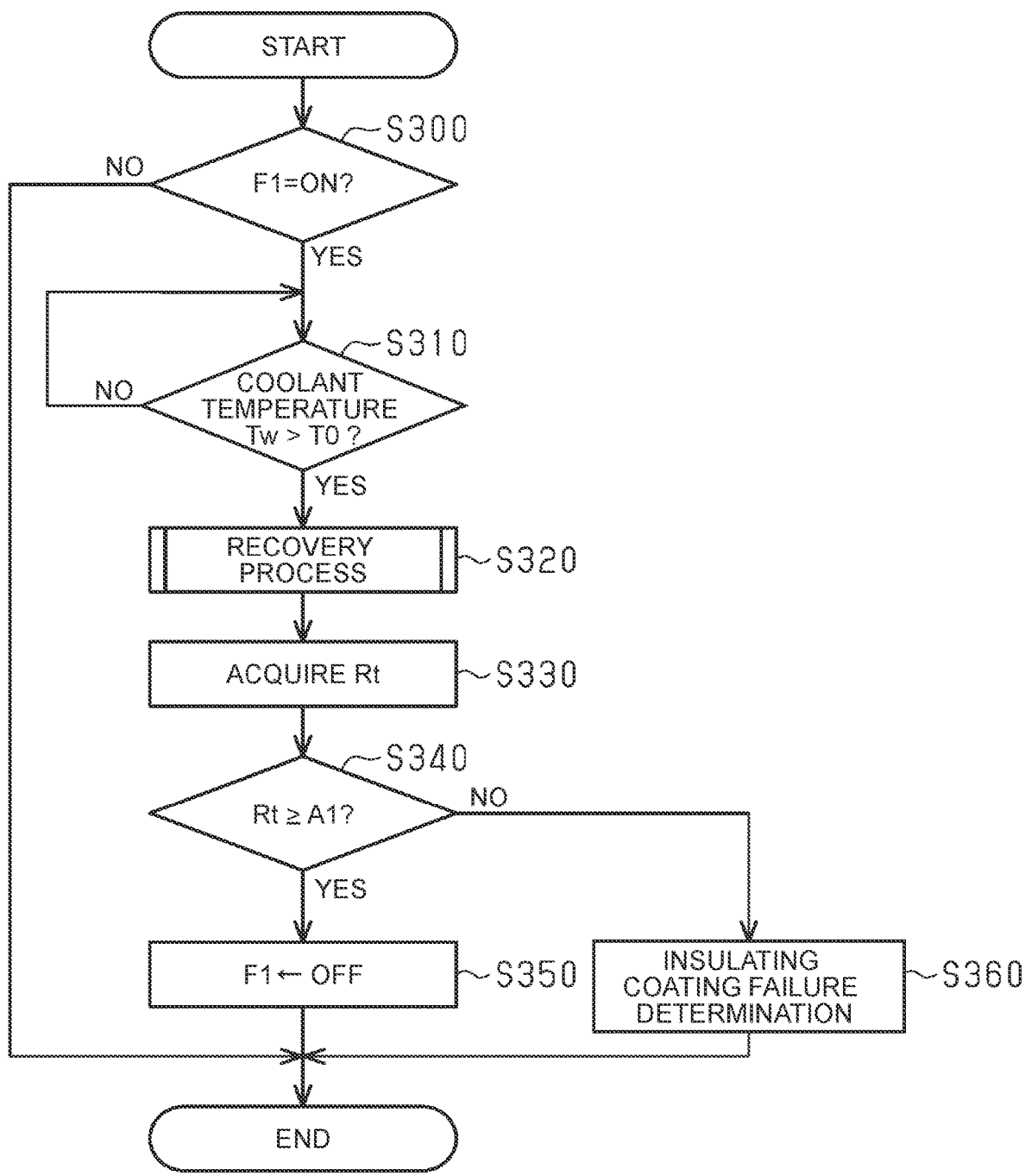
FIG. 4 is a flowchart showing the flow of processes in a routine of a recovery process performed by the controller according to the embodiment.

The routine shown in FIG. 4 is executed by the controller 100 when the internal combustion engine 20 is started. As shown in FIG. 4, when the routine is started, the controller 100 initially determines in the process of step S300 whether the low insulation resistance flag F1 is on. When the controller 100 determines in the process of step S300 that the low insulation resistance flag F1 is not on (NO in step S300), the controller 100 ends the routine. In other words, in this case, since the insulation resistance is not decreased and no conduction path is formed, the controller 100 ends the routine without performing the recovery process.

On the other hand, when the controller 100 determines in the process of step S300 that the low insulation resistance flag F1 is on (YES in step S300), the controller 100 proceeds with the process to step S310. In the process of step S310, the controller 100 determines whether the coolant temperature Tw is higher than the prescribed temperature T0. To perform the recovery process, it is necessary that warming up of the internal combustion engine 20 has been completed to a certain extent and the temperature of exhaust gas is high. The prescribed temperature T0 is set in consideration of the requirements. The value of the prescribed temperature T0 is set to a temperature such that the recovery process is able to be performed based on the fact that the coolant temperature Tw is higher than the prescribed temperature T0.

When the controller 100 determines in the process of step S310 that the coolant temperature Tw is higher than the prescribed temperature T0 (YES in step S310), the controller 100 proceeds with the process to step S320 and performs the recovery process. On the other hand, when the controller 100 determines in the process of step S310 that the coolant temperature Tw is lower than or equal to the prescribed temperature T0 (NO in step S310), the controller 100 repeats the process of step S310. In other words, the controller 100 waits until the coolant temperature Tw becomes higher than the prescribed temperature T0 and then performs the recovery process.

The controller 100 performs the recovery process in the process of step S320. The recovery process is a process of heating the catalytic converter 29 by using exhaust gas and removing a conduction path formed by carbon or a conduction path formed by condensed water. For example, a process of increasing the temperature of exhaust gas by retarding the ignition timing of each of the cylinders of the internal combustion engine 20 corresponds to the recovery process. For example, dither control corresponds to the recovery process. Dither control is to, for example, facilitate burning in the exhaust passage 21 by setting the air-fuel ratio of some of the cylinders to a lean air-fuel ratio and setting the air-fuel ratio of the remaining cylinders to a rich air-fuel ratio. A mode of switching the air-fuel ratio of all the cylinders between a lean air-fuel ratio and a rich air-fuel ratio cycle by cycle may be employed as a mode of dither control.

When a condition for stopping the recovery process is satisfied, the controller 100 stops the recovery process and proceeds with the process to step S330. The condition for stopping the recovery process just needs to be a condition based on which it is determined that the recovery process has been continued for a period of time by which completion of removal of the conduction path is expected. For example, the fact that the duration of the recovery process has reached a prescribed time may be used as the stop condition. Alternatively, the fact that an accumulated amount of flow of exhaust gas during times when the recovery process is being performed has reached a prescribed amount may be used as the stop condition.

In the process of step S330, the controller 100 acquires the insulation resistance value Rt as in the case of the process of step S130 in the routine shown in FIG. 3. In the process of the next step S340, the controller 100 determines whether the insulation resistance value Rt is higher than or equal to the threshold A1 as in the case of the process of step S140 in the routine shown in FIG. 3.

When the controller 100 determines in the process of step S340 that the insulation resistance value Rt is higher than or equal to the threshold A1 (YES in step S340), the controller 100 proceeds with the process to step S350. The controller 100 sets the low insulation resistance flag F1 to off in the process of step S350. The controller 100 ends the routine.

On the other hand, when the controller 100 determines in the process of step S340 that the insulation resistance value Rt is lower than the threshold A1 (NO in step S340), the controller 100 proceeds with the process to step S360. In the process of step S360, the controller 100 makes an insulating coating failure determination as a determination that there is an insulation fault in the EHC 210. In this case, there is a fault that cannot be resolved even when the recovery process has been performed. A failure of the insulating coating, that is, the function of the insulating coating is impaired by crack or peeling of a glass coating that is the insulating coating, is regarded as a fault that cannot be resolved even when the recovery process has been performed. In the process of step S360, the controller 100 makes an insulating coating failure determination that makes a diagnosis that there is a failure in the insulating coating. When the controller 100 makes the insulating coating failure determination, the controller 100 performs a process of informing the driver of the vehicle 10 of the fault of the EHC 210. For example, turning on an alarm lamp, showing an alarm message on a display, outputting an alarm sound, or the like is performed as a process of informing a fault.

When the controller 100 makes the insulating coating failure determination in this way, the controller 100 ends the routine.

Operation

Next, the operation resulting from execution of the routine for the preheating process shown in FIG. 3 will be described with reference to FIG. 5.

Figure 5:
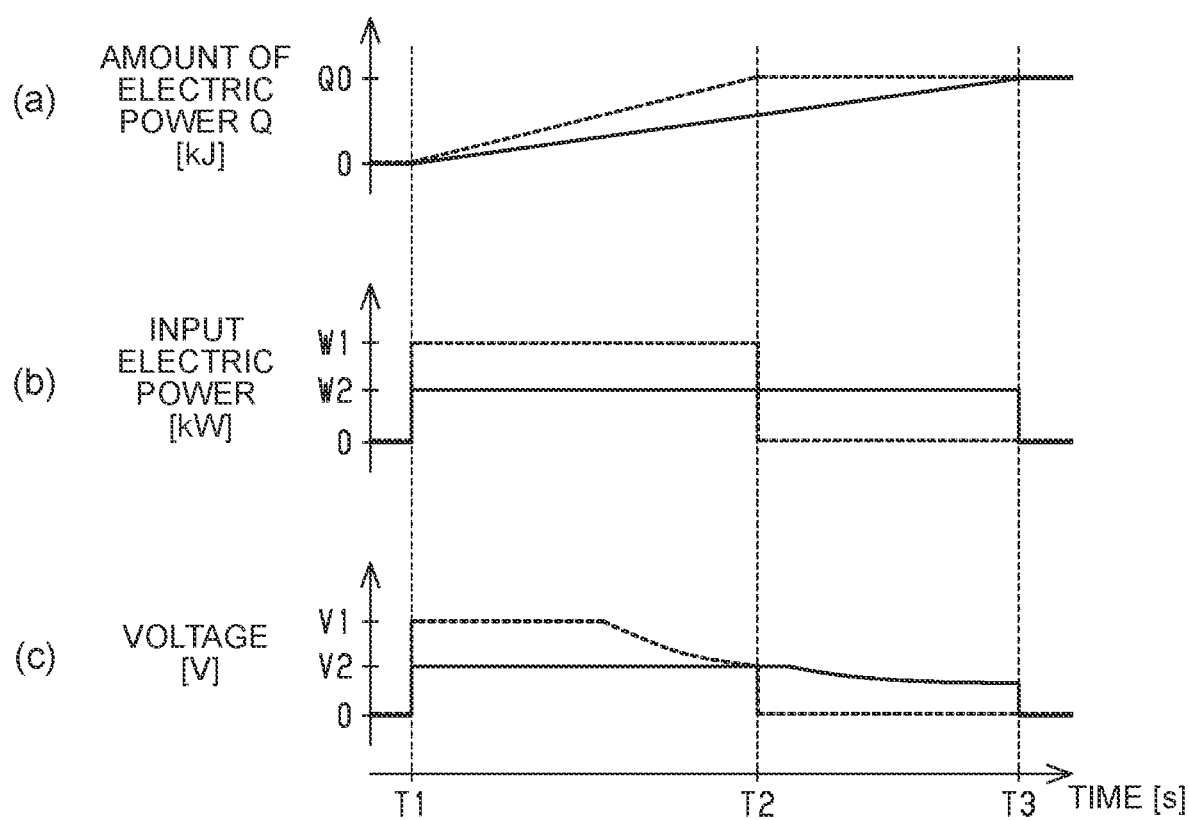
FIG. 5 is a timing chart showing changes in (a) the amount of electric power, (b) input electric power, and (c) voltage in the preheating process.

The chart (b) in FIG. 5 shows changes in the instruction value of input electric power input to the electrically heated catalyst 210 in the preheating process. The chart (a) in FIG. 5 shows the amount of electric power Q that is an accumulated value of electric power input to the electrically heated catalyst 210 in the preheating process. The chart (c) of FIG. 5 shows changes in voltage at the time when electric power is supplied to the electrically heated catalyst 210 in the preheating process.

In FIG. 5, the dashed lines respectively represent changes in the amount of electric power Q, input electric power, and voltage in the case where the insulation resistance value Rt at the start of the preheating process is higher than or equal to the threshold A1. On the other hand, the continuous lines respectively represent changes in the amount of electric power Q, input electric power, and voltage in the case where the insulation resistance value Rt at the start of the preheating process is higher than or equal to the disable threshold A2 and lower than the threshold A1.

Initially, changes in the amount of electric power Q, input electric power, and voltage in the case where the insulation resistance value Rt at the start of the preheating process is higher than or equal to the threshold A1 will be described. In this case, as represented by the dashed lines in FIG. 5, when the preheating process is started at time T1, the input electric power is set to the first electric power W1, and the upper limit voltage is set to the first upper limit voltage V1. The voltage is controlled by the controller 100 and the power supply 220 such that the input electric power is maintained at the first electric power W1. Then, the preheating process is performed. In the preheating process, the energization is performed in a state where the voltage is limited so as not to exceed the upper limit voltage, so the input electric power does not always become the first electric power W1. In other words, even when the input electric power does not reach the first electric power W1, but when the voltage reaches the first upper limit voltage V1, the voltage is not increased any more. For this reason, even when the instruction value of the input electric power is the first electric power W1, an actually input electric power can be lower than the first electric power W1.

The preheating process is performed in this way, and the temperature of the first exhaust catalyst 26 gradually increases when the energization is continued. As the temperature of the first exhaust catalyst 26 increases, the electrical resistance of the EHC 210 decreases. For this reason, a voltage for maintaining the input electric power at the first electric power W1 decreases. The voltage is controlled such that the input electric power is maintained at the first electric power W1, and, when the voltage becomes lower than the upper limit voltage, the value of the voltage gradually decreases as shown in the chart (c) in FIG. 5.

When the amount of electric power Q reaches the target amount of electric power Q0 at time T2, the energization is stopped, and the preheating process ends. On the other hand, when the insulation resistance value Rt at the start of the preheating process is higher than or equal to the disable threshold A2 and lower than the threshold A1, and, as represented by the continuous lines in FIG. 5, the input electric power is set to the second electric power W2 and the upper limit voltage is set to the second upper limit voltage V2 at time T1.

Since the upper limit voltage is set to the second upper limit voltage V2 lower than the first upper limit voltage V1 and the input electric power is also set to the second electric power W2 lower than the first electric power W1, the energization is performed in a state where the voltage and the current are decreased, and the preheating process is performed in this case. Since the voltage and the current are decreased, the rate of increase in the amount of electric power Q is lower than the rate of increase in the case where the insulation resistance value Rt represented by the dashed line is higher than or equal to the threshold A1. For this reason, in this case, the amount of electric power Q reaches the target amount of electric power Q0 at time T3. When the amount of electric power Q reaches the target amount of electric power Q0 at time T3, the energization is stopped, and the preheating process ends.

In this case, as compared to the case where the insulation resistance value Rt represented by the dashed line is higher than or equal to the threshold A1, the current and the voltage in the preheating process are low, so it takes time for the amount of electric power Q to reach the target amount of electric power Q0, and the duration of the preheating process extends. However, electric power for reaching the target amount of electric power Q0 is supplied to the EHC 210. For this reason, although it takes time, it is possible to warm up the first exhaust catalyst 26 almost similarly to the case where the insulation resistance value Rt is higher than or equal to the threshold A1.

The advantageous effects of the present embodiment will be described.

(1) When the insulation resistance of the EHC 210 is low, the controller 100 supplies electric power to the EHC 210 at a low voltage. Therefore, it is possible to avoid a ground fault even when the insulation resistance is low. As a result, the preheating process is able to be performed while avoiding a ground fault. It is possible to warm up the first exhaust catalyst 26 without operating the internal combustion engine 20.

For this reason, with the controller 100, it is possible to reduce a situation in which the internal combustion engine 20 is operated in a state where the first exhaust catalyst 26 is not able to exert sufficient performance.

(2) When the insulation resistance is too low, a ground fault can occur even at a low voltage, so it is desirable not to energize the EHC 210. When the insulation resistance value Rt is lower than the disable threshold A2 further lower than the threshold A1, the controller 100 disables the energization of the EHC 210 and stops the preheating process. Therefore, it is possible to avoid a ground fault.

(3) When the insulation resistance value Rt at the start of the preheating process is lower than the threshold A1, the controller 100 performs the recovery process of heating the EHC 210 by using exhaust gas during operation of the internal combustion engine 20. For this reason, even when the insulation resistance at the start of the preheating process is low, it is possible to recover the insulation resistance through the recovery process during operation of the internal combustion engine 20 thereafter.

(4) When the insulation resistance value Rt of the EHC 210 after the recovery process is performed is lower than a determination threshold, the controller 100 determines that there is an insulation fault in the EHC 210. In the above embodiment, the threshold A1 is the determination threshold. An insulating coating failure is determined as an insulation fault.

When the insulation resistance is not recovered even when the recovery process has been performed, it is presumable that there is a fault that cannot be resolved by the recovery process and that is not caused by formation of a conduction path by adherent carbon or condensed water. With the controller 100, it is possible to diagnose a fault that cannot be resolved by the above recovery process based on the value of the insulation resistance value Rt after the recovery process is performed.

(5) When the magnitude of the first upper limit voltage is higher than or equal to 500 ohms per unit operating voltage, it may be regarded that a sufficient insulation property is ensured. Therefore, the controller 100 sets the magnitude of the first upper limit voltage V1 to a magnitude such that the insulation resistance value Rt of the EHC 210 electrically insulated from the battery 50 by the isolation transformer becomes higher than or equal to 500 ohms per unit operating voltage. With the controller 100, it is possible to sufficiently avoid a ground fault.

The present embodiment may be modified as follows. The present embodiment and the following modifications may be implemented in combination with each other without any technical contradiction. The internal combustion engine 20 may be a spark-ignition engine or may be a compression-ignition engine.

The EHC 210 that is heated by passing a current through the exhaust catalyst has been illustrated as an example of the electrically heated catalyst. However, the configuration of the electrically heated catalyst is not limited to the above configuration. For example, the electrically heated catalyst may be configured such that a heater that generates heat when energized is provided at a location adjacent to the exhaust catalyst and the exhaust catalyst is heated by the heater.

The configuration of the catalytic converter 29 may be changed as needed. For example, the configuration of the catalytic converter 29 may be a configuration that does not include the second exhaust catalyst 27. A catalyst supported on the catalyst carrier of the exhaust catalyst is not limited to a three-way catalyst, and may be, for example, an oxidation catalyst, a storage-reduction NOx catalyst, or a selective-reduction NOx catalyst.

The vehicle 10 on which the electrically heated catalyst system 200 and the controller 100 are mounted is not limited to a plug-in hybrid electric vehicle and may be a hybrid electric vehicle that has no plug-in function or a vehicle that uses only the internal combustion engine 20 as a power source. In the examples of the vehicles other than the plug-in hybrid electric vehicle, a request to energize the EHC 210 is set to on when there is a request to start the internal combustion engine 20 and the temperature of the EHC 210 is lower than or equal to a predetermined value.

The example in which the magnitude of the first upper limit voltage V1 is set to a magnitude such that the insulation resistance value Rt of the EHC 210 becomes higher than or equal to 500 ohms per unit operating voltage has been described. A way of setting the value of the upper limit voltage is not limited to the above-described mode. The magnitude of the upper limit voltage just needs to be set to a magnitude such that a ground fault is avoided. The configuration in which the power supply 220 includes the power supply circuit 221 that includes the isolation transformer has been illustrated; however, the configuration of the power supply 220 is not limited to such a configuration.

In the above-described embodiment, when the insulation resistance value Rt of the EHC 210 at the start of the preheating process is higher than or equal to the threshold A1, the controller 100 controls the power supply 220 while setting the upper limit voltage in the preheating process to the first upper limit voltage V1. When the insulation resistance value Rt of the EHC 210 is lower than the threshold A1, the controller 100 controls the power supply 220 while setting the upper limit voltage to the second upper limit voltage V2 lower than the first upper limit voltage V1. In other words, the controller 100 performs the preheating process at a voltage lower than the voltage when the insulation resistance value Rt is higher than or equal to the threshold A1 by switching the upper limit voltage. However, a mode of performing the preheating process at a voltage that is decreased when the insulation resistance is low is not limited to the above mode. For example, the configuration is not limited to the configuration of switching the upper limit voltage in two levels as in the case of the above embodiment, a configuration of switching the upper limit voltage in three or more levels or changing continuously in accordance with the magnitude of the insulation resistance may be employed. The configuration is not limited to the configuration of decreasing the voltage supplied by operating the upper limit voltage, a configuration of decreasing the voltage supplied by operating the instruction value of the voltage supplied may be employed.

The example in which the controller 100 determines in the process of step S340 whether the insulation resistance value Rt is higher than or equal to the threshold A1 has been described. The threshold used in step S340 is not always the same as the threshold A1 used in the process of step S140. In other words, the magnitude of the threshold in step S340 just needs to be set to a magnitude such that the insulation resistance value Rt sufficiently recovered as a result of performing the recovery process is determined. For example, the threshold used in step S340 may be higher than the threshold A1 as long as the threshold is a value of a magnitude such that the sufficiently recovered insulation resistance value Rt is determined. The threshold used in step S340 may be lower than the threshold A1.

The example in which the temperature of the first exhaust catalyst 26 is estimated based on the coolant temperature Tw detected by the coolant temperature sensor 101 has been described. A method of estimating the temperature of the first exhaust catalyst 26 is not limited to such a method. For example, the exhaust gas temperature of at least one of a location upstream of the first exhaust catalyst 26 and a location downstream of the first exhaust catalyst 26 may be detected by an exhaust gas temperature sensor, and the temperature of the first exhaust catalyst 26 may be estimated based on the detected exhaust gas temperature.

The process of checking the insulation resistance value Rt and determining an insulation fault after the recovery process is performed may be omitted. Occurrence of an insulation fault may be determined at the time when the insulation resistance value Rt lower than the threshold A1 is detected in S140. The insulation resistance value Rt may be checked after the recovery process is performed, and, when the insulation resistance has been recovered, the determination that there is an insulation fault may be cancelled.

The routine for the recovery process described with reference to FIG. 4 may be omitted. In this case, the low insulation resistance flag F1 is not needed. In this case, the recovery process is omitted.

The controller 100 may be configured as one or more processors that execute various processes in accordance with a computer program (software) or one or more dedicated hardware circuits, such as an application specific integrated circuit (ASIC) that executes at least one or some of various processes. The controller 100 can be configured as circuitry including a combination of them. The processor includes a CPU and a memory, such as a RAM and a ROM, and the memory stores a program code or an instruction configured to cause the CPU to execute processes. The memory, that is, a computer-readable medium, includes any usable medium accessible by a general-purpose or dedicated computer.

What is claimed is:

1. A controller applied to an internal combustion engine in which an electrically heated catalyst that is heated when supplied with electric power is installed in an exhaust passage, wherein:
    the controller is configured to perform a preheating process of warming up an exhaust catalyst by supplying electric power to the electrically heated catalyst through control over a power supply before a start of the internal combustion engine; and
    the controller is configured to, when an insulation resistance of the electrically heated catalyst at a start of the preheating process is lower than a threshold, perform the preheating process while decreasing a voltage supplied to the electrically heated catalyst such that the voltage is lower than a voltage supplied when the insulation resistance of the electrically heated catalyst is higher than or equal to the threshold.

2. The controller according to claim 1, wherein the controller is configured to, when the insulation resistance of the electrically heated catalyst at the start of the preheating process is lower than a disable threshold lower than the threshold, disable energization of the electrically heated catalyst and stop the preheating process.

3. The controller according to claim 1, wherein the controller is configured to, when the insulation resistance of the electrically heated catalyst at the start of the preheating process is lower than the threshold, perform a recovery process of heating the electrically heated catalyst by using exhaust gas during operation of the internal combustion engine.

4. The controller according to claim 3, wherein the controller is configured to, when the insulation resistance of the electrically heated catalyst after the recovery process is performed is lower than a determination threshold, determine that there is an insulation fault in the electrically heated catalyst.

5. The controller according to claim 1, wherein:
the controller is configured to, when the insulation resistance of the electrically heated catalyst at the start of the preheating process is higher than or equal to the threshold, control the power supply while setting an upper limit value of the voltage in the preheating process to a first upper limit voltage; and
the controller is configured to, when the insulation resistance of the electrically heated catalyst at the start of the preheating process is lower than the threshold, control the power supply while setting the upper limit value of the voltage in the preheating process to a second upper limit voltage lower than the first upper limit voltage.

6. The controller according to claim 5, wherein:
the electrically heated catalyst is supplied with electric power converted from electric power of a battery by the power supply that has a power supply circuit including an isolation transformer; and
a magnitude of the first upper limit voltage is set to a magnitude such that the insulation resistance of the electrically heated catalyst becomes higher than or equal to 500 ohms per unit operating voltage.

* * * * *